UNITED STATES PATENT OFFICE.

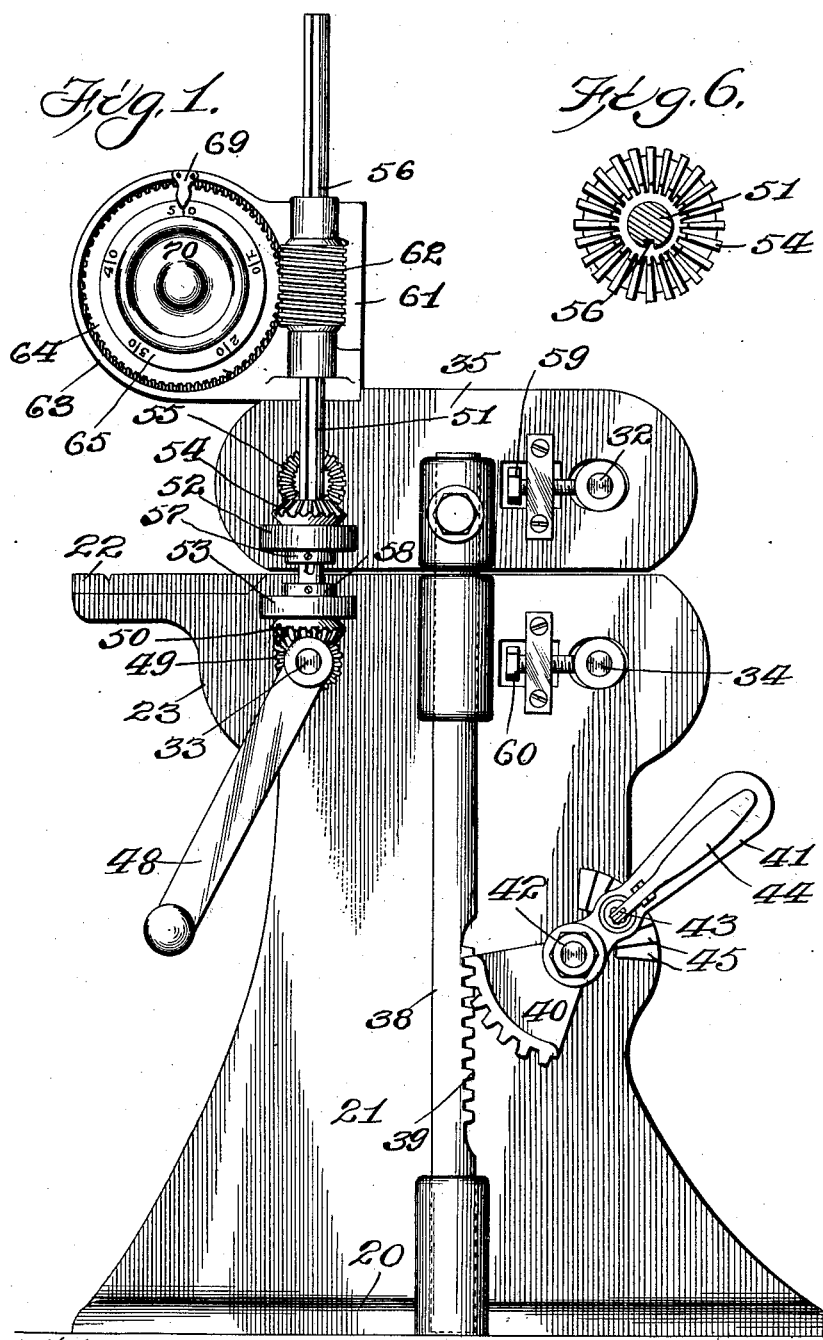

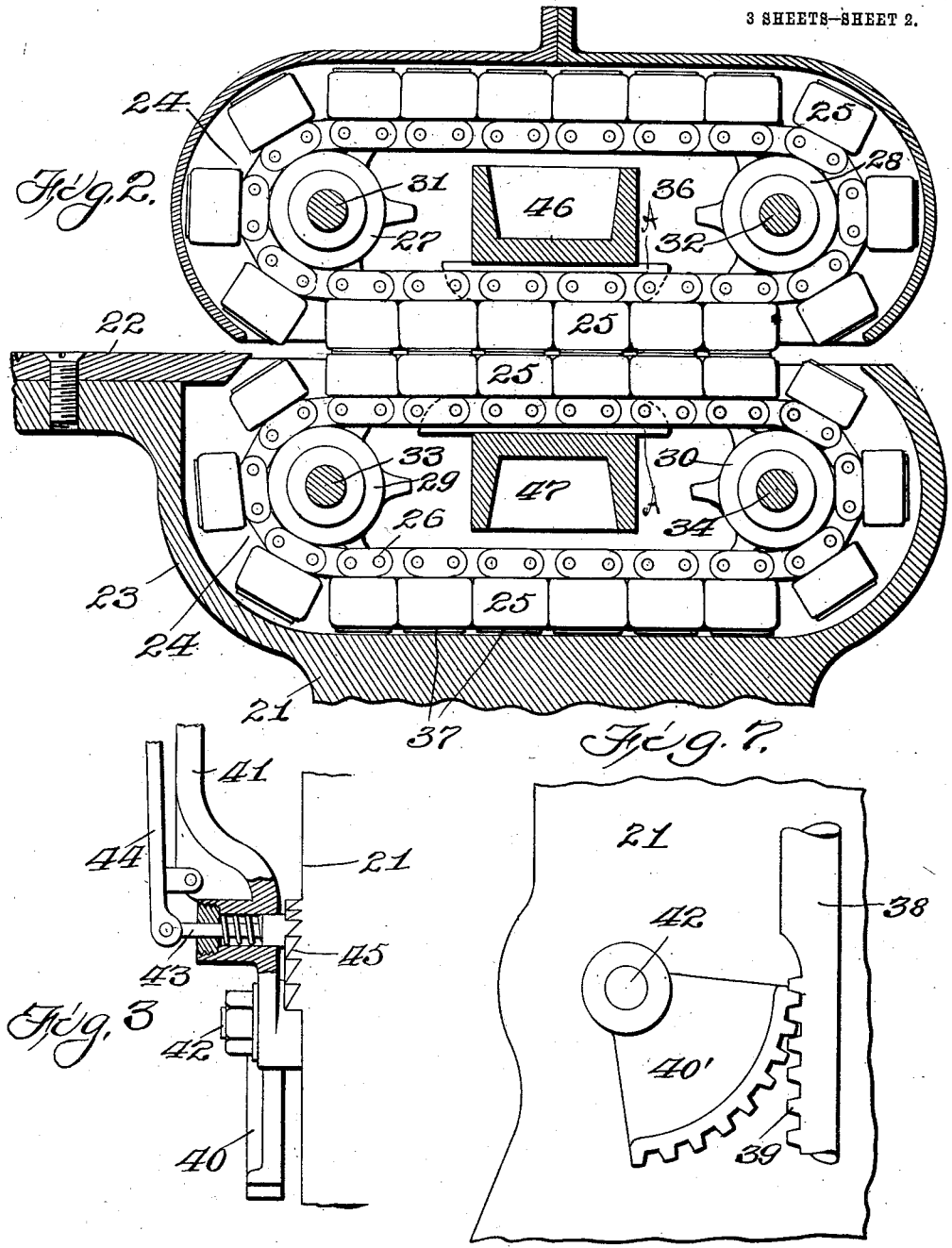

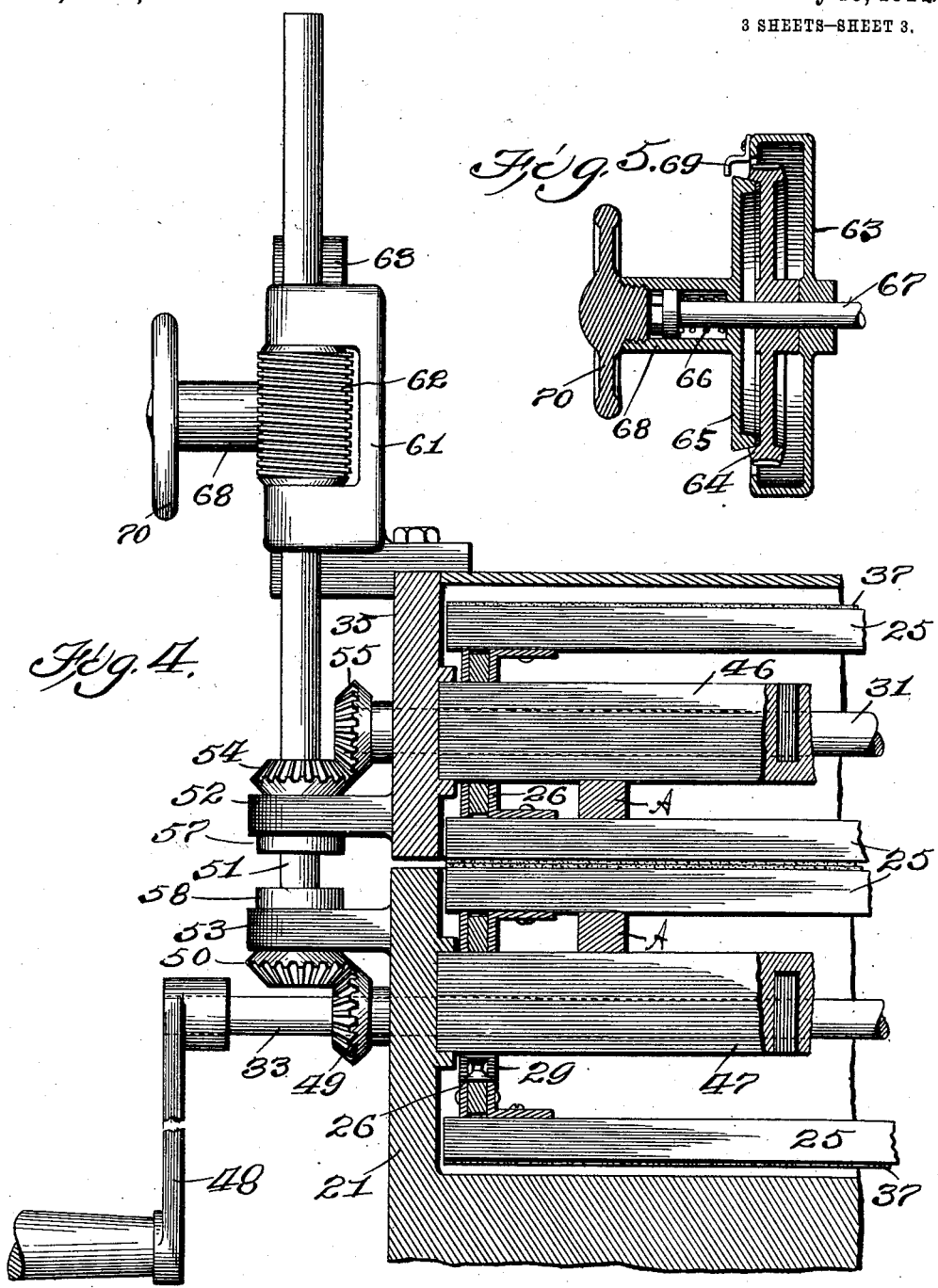

CHARLES M. KACHEL, OF ST. LOUIS, MISSOURI, ASSIGNOR TO CLOTHMETER MANUFACTURING COMPANY, A CORPORATION OF MISSOURI.

CLOTH-MEASURING MACHINE.

1,097,098.      Specification of Letters Patent.      Patented May 19, 1914.

Application filed March 20, 1911. Serial No. 615,758.

*To all whom it may concern:*

Be it known that I, CHARLES M. KACHEL, a citizen of the United States, and a resident of St. Louis, Missouri, have invented certain new and useful Improvements in Cloth-Measuring Machines, of which the following is a specification containing a full, clear, and exact description, reference being had to the accompanying drawings, forming a part hereof.

My invention relates to an improved cloth measuring machine, and has for its object to provide an apparatus in which a measuring scale is operated by the passage of cloth or other sheet fabric through the apparatus.

In the drawings Figure 1 is a side elevation of a machine embodying my invention. Fig. 2 is a vertical sectional view of the upper portion of the same. Fig. 3 is an enlarged detail view of the elevating-arc 40 and its connections. Fig. 4 is a rear elevation of the end of the machine which carries the scale-disk 65. Fig. 5 is a vertical mid-sectional view of the scale-disk 65 and its immediate connections. Fig. 6 is a transverse sectional view of the shaft 51, and the upper face of the bevel gear 54 is also shown therein. Fig. 7 is a side elevation of the elevating-arc 40′ and its connections.

As shown in the drawings, I employ a base plate 20 from which the side-frames 21—21 extend vertically, to the level of the plate of the table 22, which is mounted upon the brackets 23—23. The plane of the table 22 is the plane upon which the fabric measured by my apparatus is delivered after its passage between the meeting faces of the belt-friction-carriers 24—24. These friction carriers are mounted and constructed as illustrated in Fig. 2, their construction being as follows: Each friction-carrier 24 comprises a series of parallel bars 25, mounted at their ends upon the chain belts 26, their mounting being so effected that the outer faces of those of the bars 25 which are moving in a horizontal plane present a substantially plane surface (see Fig. 2), their meeting edges being in contact. The belts 26 are mounted upon the pairs of sprocket-wheels 27, 28, 29 and 30, carried respectively by the shafts 31, 32, 33 and 34, of which the shafts 33 and 34 are journaled in the side-frames 21—21, shafts 31 and 32 being mounted in bearing blocks 35 and 36, shaft 31 being mounted immediately above shaft 33, and shaft 32 immediately above shaft 34.

The carriers 24 are provided with an equal number of the bars 25, the bars 25 are of equal length, width and thickness, and the outer face of each of said bars 25 is provided with a strip of non-slipping material 37, so that a secure frictional contact is exerted by the same upon the surfaces of a sheet of fabric passing between said carriers 24 (see Fig. 2.)

The bearing-blocks 35 and 36 are fixed to the upper extremities of the elevator-rods 38—38, whose lower ends are toothed as indicated by the numeral 39, to engage with the toothed surface of the elevating-arcs 40 and 40′. The elevating-arc 40 is controlled by the hand-lever 41, mounted on the shaft 42, the shaft 42 being mounted through the side-frames 21—21. The hand lever 41 is provided with a plunger 43, controlled by the secondary lever 44, and its inner end engaging with detents 45 upon the adjacent face of the side-frame 21.

The elevator rods 38—38 are thrust upwardly by the downward movement of the hand-lever 41, to separate the friction-carriers 24—24, so that the end of the bolt of cloth or other fabric is admitted in position to be engaged between the surfaces of the carriers 24—24 when the bearing-blocks 35—36 are again lowered to permit their weight and that of the upper carrier 24 to rest upon the upper surface of the fabric.

To prevent the sagging of the meeting surfaces of the carriers 24—24, I have provided channeled transverse supports 46 and 47, mounted as shown in Fig. 2; 46 being fixed at its ends to the inner faces of the bearing-blocks 35 and 36, and 47 being similarly fixed between the inner faces of the side-frames 21—21.

On the under face of the support 46, and on the upper face of the support 47 is located and firmly fixed a plurality of guide and supporting strips "A," which are arranged at suitable intervals apart throughout the width of the supports, the ends of said strips being suitably curved as shown in Fig. 2, and the thickness of these strips is of a size to fit between the supports and the parallel bars 25 which form a part of the belt friction carriers; these strips act as a support for the bars, and said bars are of such length as to keep the top row of the under friction carriers and the bottom row of the upper friction carriers in perfect horizontal position so that sagging is absolutely impossible, and that a perfect grip is had upon the cloth which passes between the same.

I will next describe the operative means whereby the friction-carriers 24—24 are caused to travel, to carry the sheet-fabric to delivery over the table 22.

At the outer end of the shaft 33 I provide a crank 48 as shown, which serves to rotate the sprocket wheels 29 and 30. A vertical bevel-gear 49 is mounted on the shaft 33 and meshes with the bevel-gear 50 on the lower end of the vertical shaft 51, which is journaled in the brackets 52 and 53 Fig. 4. Upon the shaft 51 is slidably mounted a bevel gear 54, meshing with the bevel gear 55 on the shaft 31. When the bearing blocks 35 and 36 are elevated by the lever 41 as above described, the gear 54 which is carried in the bracket 52 will be carried up along the shaft 51 to the desired height, remaining at all times in mesh with the gear 55, with the bracket (see Fig. 4) and its rotation upon the shaft 51 being controlled by the longitudinal key way 56 formed in the shaft 51. The gear 54 having a key operating in the key way of the shaft and said gear is held in mesh with the gear 55 by the collar 57 secured to the hub of the gear 54 which extends through an opening in the bracket and the shaft is supported in the bracket 53 by the collar 58.

The requisite distention of the friction carriers 24—24 is secured by the belt-tighteners 59 and 60, operating upon the shafts 32 and 34 respectively.

The foregoing assemblage of parts constitutes the form of winding mechanism which I have illustrated, and which I prefer, but to whose details I do not desire to be limited. I am aware that heretofore cylindrical rollers of various material and surfacing have been employed in the winding of cloth for measurement purposes, but the employment of two endless friction carriers, in the nature of endless belts, arranged to contact with each other, and removably mounted with reference to each other, to receive and exert frictional contact upon a sheet fabric desired to be wound, is novel with my invention.

In the drawings I have illustrated a measuring means which may be described as follows: A bifurcated bracket 61 is carried by the bearing block 35 to hold the worm-gear 62 which is slidably keyed to the vertical shaft 51. The annular housing 63 is carried by the bracket 61, and contains the disk-gear 64, meshing with the worm-gear 62. Upon the outer face of the disk-gear 64 the annular scale-disk 65 is secured by frictional contact, being normally movable with the disk-gear 64 by the inward thrust of the coil-spring 66 which surrounds the axle 67 and is contained in the cylindrical housing 68. The scale divisions desired are indicated upon the outer face of the scale-disk 65, at or near its outer edge, and register with the index 69 (see Fig. 1), the scale indicated in the drawing representing fifty units of measurement, usually indicating lineal yards of the fabric being measured.

The scale-disk 65 being adjusted at zero, the operation of measurement is effected by the revolution of the crank 48 counter clockwise, through the vertical shaft 51 and its connections, the shaft 51 also serving to rotate the scale-disk 65. When the desired measurement is thus effected, the scale-disk 65 is released from frictional contact with the face of the disk-gear 64 by an outward pull upon the hand-wheel 70, which is fixed upon the outer end of the housing 68, and the hand-wheel 70 is then rotated to revolve the scale-disk 65 until its initial zero (which is indicated by the numeral 50 in the scale as shown in Fig. 1) registers with the index 69. When so adjusted the machine is ready for another operation of winding or measurement.

It will be noted that I have not shown any receptacle for the bolt from which the fabric is unwound in the operation of the described mechanism. This omission is purposely made because no receptacle is needed therewith, the machine is usually placed upon a table or counter, and the bolt may be deposited upon the same surface with the machine, and at any point conveniently near the machine; it should be placed with its axis substantially parallel with the shafts 31, 32, 33, 34, and on the side of the machine opposite to the side carrying the table 22, as the delivery of the cloth during its measurement will be forward from between the friction carriers 24—24 over the table 22.

What I claim is—

1. In a cloth measuring machine, a fixed belt friction carrier, a second belt friction carrier mounted in a plane parallel to that of the first named carrier, means carried by the machine for moving said carriers into and out of contact with each other, and means for driving said carriers; in combination with a measuring scale operated by said driving means.

2. In a cloth measuring machine, a fixed belt friction carrier, a second belt friction carrier mounted in a plane parallel to that of the first named carrier, means carried by the machine for moving said carriers into and out of contact with each other, and means for driving said carriers, means for holding the meeting faces of the carriers in frictional contact; in combination with a measuring scale operated by said driving means.

3. A device of the class described comprising an endless belt friction mechanism through which the fabric to be measured passes by frictional engagement with the belts, guide and supporting strips located at intervals apart in the belt friction mechanism for retaining the contacting portions of the frictional belt mechanism in proper alinement, and to prevent the same from sagging, and means for elevating the upper section of the belt friction mechanism independent of the lower section, sustantially as specified.

4. A cloth measuring machine comprising an endless two section belt friction mechanism, each section of the mechanism supported in a separate housing, supports located in each section, guide and supporting strips located at intervals on the supports and contacting with the contacting portions of both sections of the belt friction mechanism for holding the same in horizontal position and preventing sagging of that portion, means carried by the machine for elevating the upper section of the belt friction mechanism independent of the lower section, in combination with a scale disk carried by the upper section for registering the number of yards passed through the machine, substantially as specified.

5. A cloth measuring machine comprising a suitable frame, an endless friction carrier rotatably mounted therein, an upper endless carrier operating in conjunction with the first mentioned carrier, a frame supporting the same, a scale disk mounted on the upper frame, means mounted on the first mentioned frame for elevating the upper carrier, its frame and scale disk, means for operating both carriers simultaneously and means for supporting the upper carrier while in an elevated position, substantially as specified.

6. A cloth measuring machine comprising a pair of endless friction carriers rotatably mounted and located one above the other, frames supporting the same, parallel bars having contact surfaces of non-slipping material carried by the endless carriers, the contacting surfaces arranged to register when feeding the cloth between the carriers, a scale disk carried by the upper frame, a raising mechanism for elevating the upper frame, scale disk and carrier away from the lower carrier, and an operating mechanism for rotating the carriers simultaneously when in contact with each other, substantially as specified.

In testimony whereof, I have signed my name to this specification, in presence of two subscribing witnesses.

CHARLES M. KACHEL.

Witnesses:
R. G. ORWIG,
N. E. BROCKMAN.

---

Copies of this patent may be obtained for five cents each, by addressing the "Commissioner of Patents, Washington, D. C."